United States Patent [19]

van Schagen et al.

[11] Patent Number: 4,610,298

[45] Date of Patent: Sep. 9, 1986

[54] PROCESS AND INSTALLATION FOR APPLYING A CONTROLLABLE HEAT-EXCHANGE IN REGENERATIVE HEAT-EXCHANGER

[75] Inventors: Hans W. van Schagen, Bussum; Johannes W. Tewes; Rodolphe H. Goede, both Amsterdam, all of Netherlands

[73] Assignee: Stork Amsterdam B.V., Amsterdam, Netherlands

[21] Appl. No.: 753,261

[22] Filed: Jul. 9, 1985

Related U.S. Application Data

[63] Continuation-in-part of Ser. No. 518,796, Jun. 23, 1983, abandoned.

[30] Foreign Application Priority Data

Dec. 8, 1981 [NL] Netherlands .......................... 8105524
Dec. 8, 1982 [WO] PCT Int'l Appl. ................. 82/00262

[51] Int. Cl.[4] ............................ A23C 3/02; B60H 1/00
[52] U.S. Cl. ......................................... 165/39; 165/66; 165/909
[58] Field of Search .................. 165/39, 66, 140, 141, 165/142, 155, 166, 167, 909

[56] References Cited

U.S. PATENT DOCUMENTS

| | | | |
|---|---|---|---|
| 2,522,796 | 9/1950 | Olson et al. ........................ | 165/66 X |
| 2,547,430 | 4/1951 | Aldridge et al. ................... | 165/66 X |
| 2,659,580 | 11/1953 | Hytte ................................... | 165/66 |
| 2,937,856 | 5/1960 | Thomson ............................. | 165/66 |
| 3,041,046 | 6/1962 | Nellis, Jr. et al. ................. | 165/66 X |
| 3,101,041 | 8/1963 | Hallström .......................... | 165/66 X |
| 3,213,929 | 10/1965 | Marshall et al. ................... | 165/66 X |
| 3,451,471 | 6/1969 | Palm ................................... | 165/66 |
| 4,416,194 | 11/1983 | Kemp ................................ | 165/66 X |
| 4,534,986 | 8/1985 | Hasting ............................. | 165/66 X |

Primary Examiner—Albert W. Davis, Jr.
Assistant Examiner—Randolph A. Smith
Attorney, Agent, or Firm—John Gibson Semmes

[57] ABSTRACT

A process and an installation for the heat treatment of a product liquid based on the continuous flow principle, in which a regenerative heat-exchanger is used in conjunction with a high temperature heater for product liquid. A part of the heat-exchanger is provided with an additional heat-exchanging surface which is connected to a cooling circuit, the variable capacity of which is determined and controlled by both the temperature and the output of the product liquid, whereby to maintain the efficiency of the heat treatment under changing input quantities of the product liquid. Control, above is effected by a combination temperature sensor interconnected to the product liquid conduit directed to the high temperature heater and a flow rate sensor interconnected to another given portion of the product liquid conduit.

3 Claims, 10 Drawing Figures

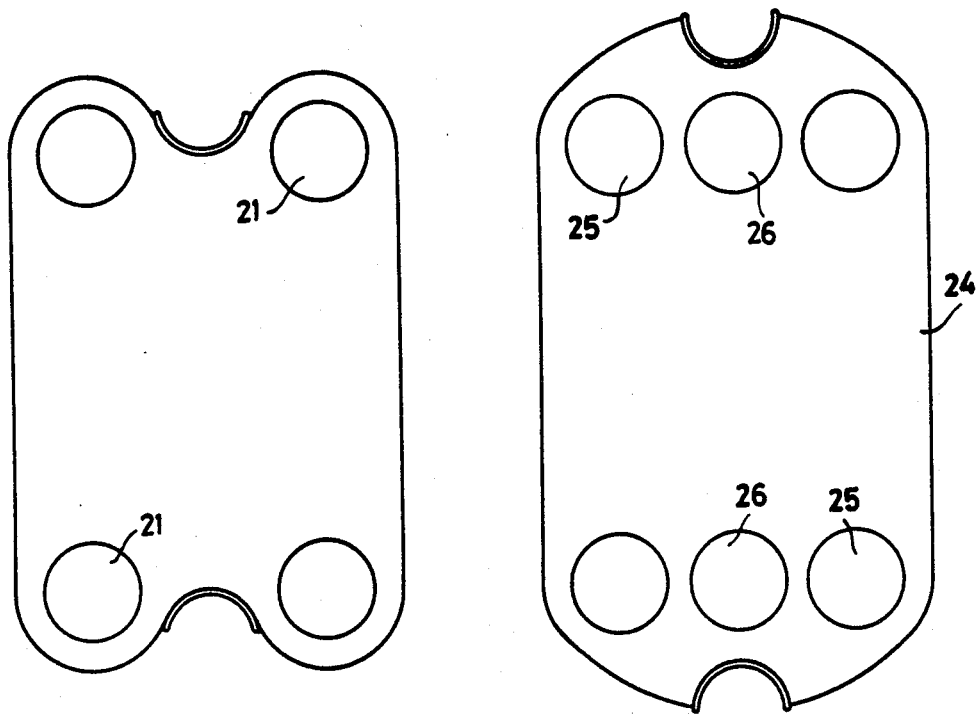
Fig. 5.
PRIOR ART
Fig. 6.
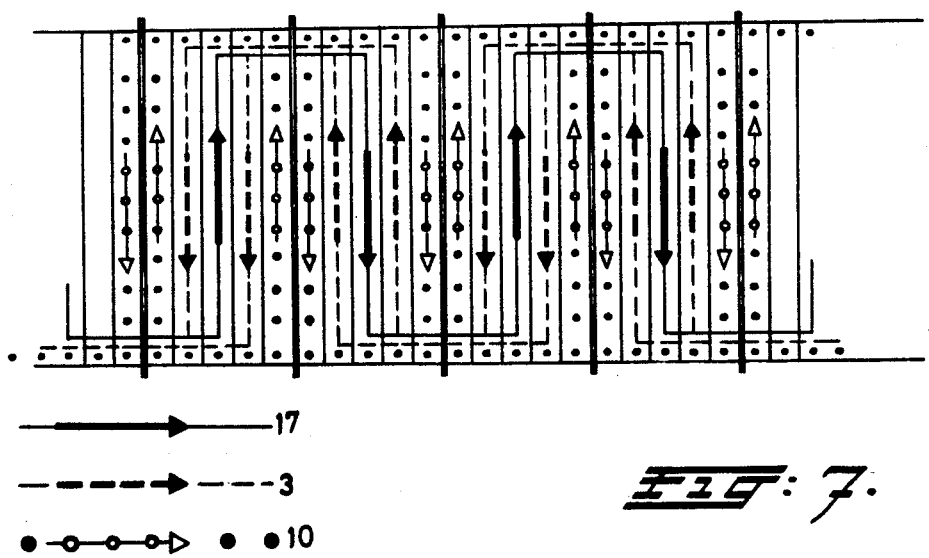
→ 17
--→ 3
•-○-○-▷ • •10
Fig. 7.

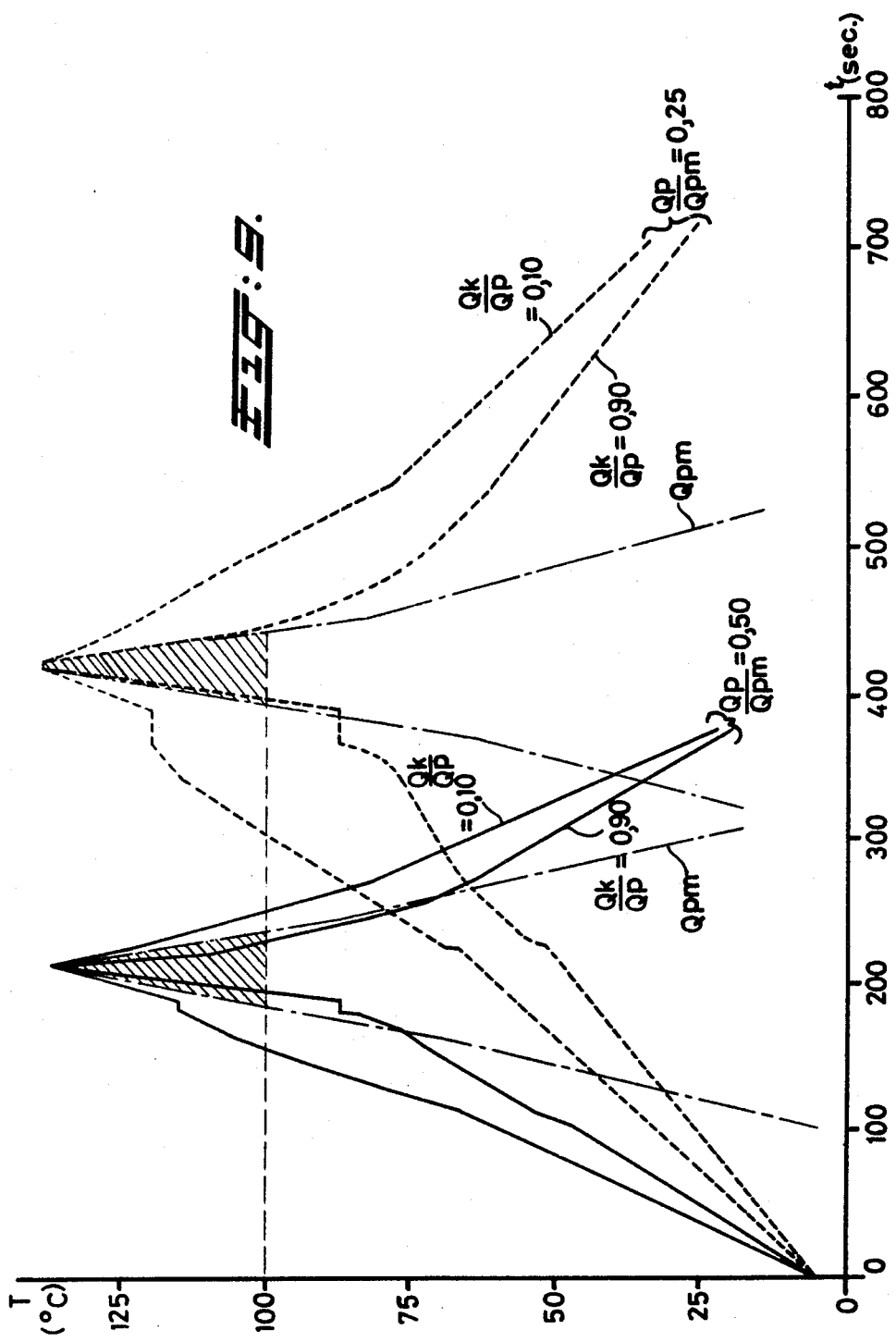

PROCESS AND INSTALLATION FOR APPLYING A CONTROLLABLE HEAT-EXCHANGE IN REGENERATIVE HEAT-EXCHANGER

CROSS-REFERENCES TO RELATED APPLICATIONS

This is a patent application based upon Netherlands Application Serial No. 81 05524, filed 8/12/81 (priority claimed under 35 U.S.C. 119) also described and claimed in International Patent Application PCT/EP82/00262 filed 12/8/82. It constitutes a continuation-in-part of U.S. patent application Ser. No. 518,796, filed June 23, 1983 now abandoned.

BACKGROUND OF THE INVENTION

This invention relates to a process and apparatus for operating an installation for the heat treatment of a product liquid on the continuous flow principle, the product liquid being brought to the required temperature in a high temperature HT heat-exchanger by a heating medium, the treated and outgoing product liquid pre-heating the incoming untreated product liquid in counter-current in a regenerative heat-exchanger. The abbreviated term HT heat-exchanger denotes a heat-exchanger, operative at the highest temperature.

Related processes and apparatus are frequently used, inter alia, for the sterilization of milk. During sterilization, milk must be heated for a specific period at a specific temperature in order to kill or inactivate bacteria which would cause spoilage. As the heating temperature rises, the heating time required decreases. The longer the heating period, the more effective sterilization, but there are limits to this, since the chemical transformation processes involved at elevated temperature result in undesirable quality changes in the milk if applied for too long.

DESCRIPTION OF THE RELATED PRIOR ART

Just as may be the case with other temperature/time treatment processes, the treatment in this case must also take place within limits defined by certain criteria. In the sterilization of milk, for example, there are two of these (see FIG. 1A), i.e. $C_1 =$ the degree of sterilization and $C_2 =$ the chemical transformation occurring. The graph shown in FIG. 1A illustrates the relationship between the temperature T and the treatment time t. In the graph the point A shows the situation for a sterilization plant operating at full capacity and in which the equivalent temperature in combination with the treatment time is such that sterilization takes place adequately while the chemical transformations as yet remain below the respective applicable limit. If, however, the output of an installation falls to a fraction of the maximum output for which the installation is designed, the rate of flow of the product decreases as a result of this fall in output. This entails that the throughput time of the product to be treated increases in inverse proportion to the capacity decrease, as a result of which an unfavourable chemical transformation may occur, for example, see situation B in FIG. 1A. In such a case, although the criterion applicable to sterilization is still satisfied, the criteria applicable to chemical transformations are exceeded.

In practice a method has already been developed for controlling the temperature/time relationship. In such prior art method heating takes place by the injection of steam, followed by flashing out at reduced pressure the steam condensed in the milk. The disadvantage of this system, however, is the high energy consumption. Indirect heating of the liquid by means of steam in combination with regenerative heat exchange between the heated outgoing liquid and the cold incoming liquid offers great advantages from the energy aspect. However, this system has the disadvantage that if the output has to be reduced for some reason in an installation of a specific capacity, the residence time of the product liquid is increased in the same proportion as the liquid flow is reduced with respect to the maximum value (at the design capacity). When the output of the installation decreases, the above-mentioned undesirable quality changes will then occur relatively quickly.

Doubtless attempts will be undertaken to operate a given sterilization plant at or near the design output whereby a optimum energy consumption may be obtained with optimum product treatment. If, however, the output decreases temporarily, e.g. because the processing capacity temporarily decreases at the inlet or outlet ends, the product quality must not deteriorate as a result. A known step in connection with capacity reduction, is to divide the HT heat exchanger into a number of series-connected sections, of which one or more is/are inactivated, as considered from the milk inlet point. The section or sections disconnected fills/fill with condensate and no longer participates/participate in the heat treatment. FIG. 1B is a graph showing the effect of this known step. The temperature/time relationship is shown in this graph for five different output situations. The part involved is the area of the zone I enclosed by the graph above the 100° C. limit, because the time that the product is subjected to these temperatures is, as considered practically, the determining factor for the sterilization and chemical transformations. For the maximum design output of 100%, this area I-100 is shown in triangular shading and is such that the required degree of sterilization is obtained, on the one hand, while on the other hand undesirable chemical transformations are still below the acceptable level. On an output reduction of up to 80%, the temperature/time area increases to I-80, in FIG. 1B, so that the chemical transformations increase, but not to the extent that it is necessary to disconnect a section from the HT heat exchanger. This disconnection is shown in the arbitrarily chosen graphs for an output reduction of up to 50%, 33% and 25%. It will be clearly seen that the resulting reduction in the temperature/time areas is insufficient to return the areas I-50, I-33 and I-23 to the required value I-100 or the temporarily still admissable maximum value I-80. The known step therefore does not provide sufficient opportunity of obtaining the admissible temperature/time relationship in the event of a relatively considerable fall-off in output.

The closest prior art, as at present advised and distinguishing characteristics of the invention thereon are recited as follows: U.S. Pat. No. 4,444,015 MATSUMOTO This patent has as its subject a liquid natural gas (LNG) gasification plant in which two RANKINE cycles with two different working media are used, incorporating a turbine to extract energy from the compressed gaseous media. The liquified natural gas is used as a cold source for both RANKINE cycles to condense the gaseous media coming from the turbines. For this purpose LNG is passed through a first multifluid heat exchanger through which the low pressure gaseous first medium leaving the first turbine and the pressurized condensate of the first medium are passed. After leaving the first heat exchanger the LNG is passed through a second multifluid exchanger through which is also passed the partly gasified pressurized condensate of the first medium and the low pressure gaseous second medium from the second turbine. When passing through the two multifluid heat exchangers the LNG is gasified and increases in temperature, and is further increased in temperature in a heat exchanger fed by sea water. The flow of the cold LNG is not regulated, as it always maintains a constant flow which is dictated by the demand for gasified LNG. On the contrary the flow of the medium in the RANKINE-cycle should be changed when the LNG flow differs from its nominal value. Under normal conditions of operation the coolant flow according to the present invention is zero, whereas under normal conditions, in the LNG gasification plant, according to MATSUMOTO, the LNG flow (=coolant) is at its rated value.

U.S. Pat. No. 4,184,536 SMITH

SMITH deals with a cooling system for rejecting waste heat as from a power plant. This consists of a cooling tower, incorporating a plurality of coolant tubes provided with cooling fins and each having a plurality of cooling channels therein, means for directing a heat exchange fluid (A) from the power plant through less than the number of cooling channels to cool the heat exchanging fluid under normal conditions, means for directing water through the remaining cooling channels whenever the ambient temperature rises above the temperature at which discooling by air of the heat exchange is deemed sufficient and means for cooling the water as by evaporation.

This heat exchanger uses the two coolant media air and water to cool a fluid which is circulated in a closed loop. Air is used normally and water is added when air temperature rises above a temperature which is sufficient to cool the circulating fluid. For these purposes air temperature and/or temperature of the circulating heat exchange fluid (A) is measured. There is no suggestion herein of a regeneration heat exchanger combined with a high temperature heater wherein there is provided interconnected temperature with flow rate control for the control of flow of the cooling fluid.

SUMMARY OF THE INVENTION

It is an object of the present invention to provide process and apparatus therefor without the said prior art shortcomings. To this end, according to the invention, when the output of the product liquid decreases, a flow of cooling liquid is so passed through the regenerative heat-exchanger that the residence time of the product liquid in the HT zone and the temperatures occurring in these conditions result in a heat treatment approaching the optimum time/temperature relationship at the maximum design output of the installation. This step is a relatively simple way of enabling the results of fluctuating outputs of product liquid to be controlled. The product quality can be maintained and there is no need to discard any product. The return to the full capacity condition also takes place without any difficulty.

In order to achieve the optimum heat exchange in the regenerative heat-exchanger, the outgoing and incoming flows of product liquid are taken through the regenerative heat-exchanger in counter-current and the cooling liquid flow is conveyed in counter-current to one of the product liquid flows in the high-temperature part of said heat-exchanger, preferably, in counter-current to the incoming heating-up product liquid flow.

As indicated, the invention also relates to an installation for using the above process, comprising a regenerative heat exchanger. According to the invention, an installation of this kind is distinguished in that at least a part of the regenerative heat-exchanger comprises an extra heat-exchanging surface contained in a cooling liquid conduit for withdrawing heat from the product liquid, said conduit containing a control means reacting to both the temperature of the product liquid in the conduit to the HT-heat-exchanger and to the output of the product liquid for influencing the flow of cooling liquid.

The regenerative heat exchanger can in principle be constructed in two ways, each defined herein. In the case of a regenerative tube heat-exchanger, a set of three concentric tubes can be used so that three channels are formed, the innermost or outermost channel being used for the cooling liquid and the adjacent channel preferably being used for the incoming heating-up product liquid. In a regenerative plate heat-exchanger, the plates are provided with an extra set of passage apertures for the passage of the cooling liquid.

In operation, the product is heated in a high temperature heater, HT-heater, keeping the product for some time at this elevated temperature and then cooled down in a counter current heat exchanger in heat exchanging contact with product entering the HT-heater. Particularly in the sterilization of milk the time at which the milk is subjected to the higher temperatures is critical. The longer the milk remains at a temperature above the minimum sterilization temperature, the more bacteria causing decay are killed. A maximum sterilization temperature should not be exceeded in order to prevent chemical decomposition and burning of the milk. As a matter of fact the time factor plays an important role. Using a longer time not only increases the sterilization effect but also increases chemical decomposition and burning. Using a shorter time decreases the sterilization effect and decreases also the danger of chemical decomposition and burning. The time needed to obtain an acceptably sterilized product without chemical decomposition and burning is thus allowed to vary only between close limits.

Sterilization plants are laid out for a certain nominal capacity of product to be treated and at this capacity the needed time temperature relationship is obtained. The sterilized product after having been cooled down sufficiently is then via a number of parallel conduits fed to filling machines, which in turn are followed by closing and packing machines. There arises a problem: when e.g. one of the filling machines experiences a break down, the sterilization should be able to operate at a lower capacity e.g. to $\frac{2}{3}$ in the case of a breakdown of one machine of three etc. Due to the fixed lay-out of the sterilization plant however a reduction of the product flow velocity to $\frac{2}{3}$ of the nominal value would lead to an increase in time at which the product is subjected to the higher temperatures of 50%.
(if L=length of the trajectory
Vn=nominal flow velocity
then: the nominal time $t_n = L/V_n$
when the flow is reduced to $\frac{2}{3} V_n$ then: $t = L/2/3V_n = 3/2 \cdot L/V_n = 3/2 t_n$)

Small decreases of the nominal flow can be coped with by decreasing the effective heat exchanging surface in the HT-heater through effecting a raise of the condensate level in the HT-heater, thus diminishing the heat transfer obtained through the steam. It is thus an object of the invention to obtain an installation, in which by the use of simple means, the correct time-temperature relationship for the product at the elevated sterilization temperature, can be achieved for greatly reduced capacity from the nominal value and which does not necessitate the use of a buffering reservoir.

According to the invention this is achieved by a sterilization installation, which includes a counter current heat exchanger for the product leaving and entering the HT-heater provided with a passage for a coolant fluid, which passage is in heat exchanging contact with the product fluid passage combined with means to regulate the flow of coolant fluid. The coolant flow $Q_c$ is regulated such that at decreasing values of the product flow $Q_p$, the coolant flow $Q_c$ increases in relation to the actual value of the product flow $Q_p$.

Thus in the invention, at nominal product flow $Q_{pn}$:

$Q_c/Q_p=0-Q_c=0-Q_p=Q_{pn}$

At product flow $Q_p=0,5\ Q_{pn}$:

$Q_c/Q_p=0,7-Q_c=0,7\ Q_p=0,35\ Q_{pn}$

At product flow $Q_p=0,25\ Q_{pn}$:

$Q_c/Q_p=0,9-Q_c=0,9\ Q_p=0,225\ Q_{pn}$

BRIEF DESCRIPTION OF THE DRAWINGS

The invention will be explained more in detail with reference to the drawings, which illustrate in highly diagrammatic form: an installation, FIG. 2; some details thereof, FIGS. 3-7 and graphs, FIGS. 8 and 9.

DESCRIPTION OF THE PREFERRED EMBODIMENTS

Figure 2:
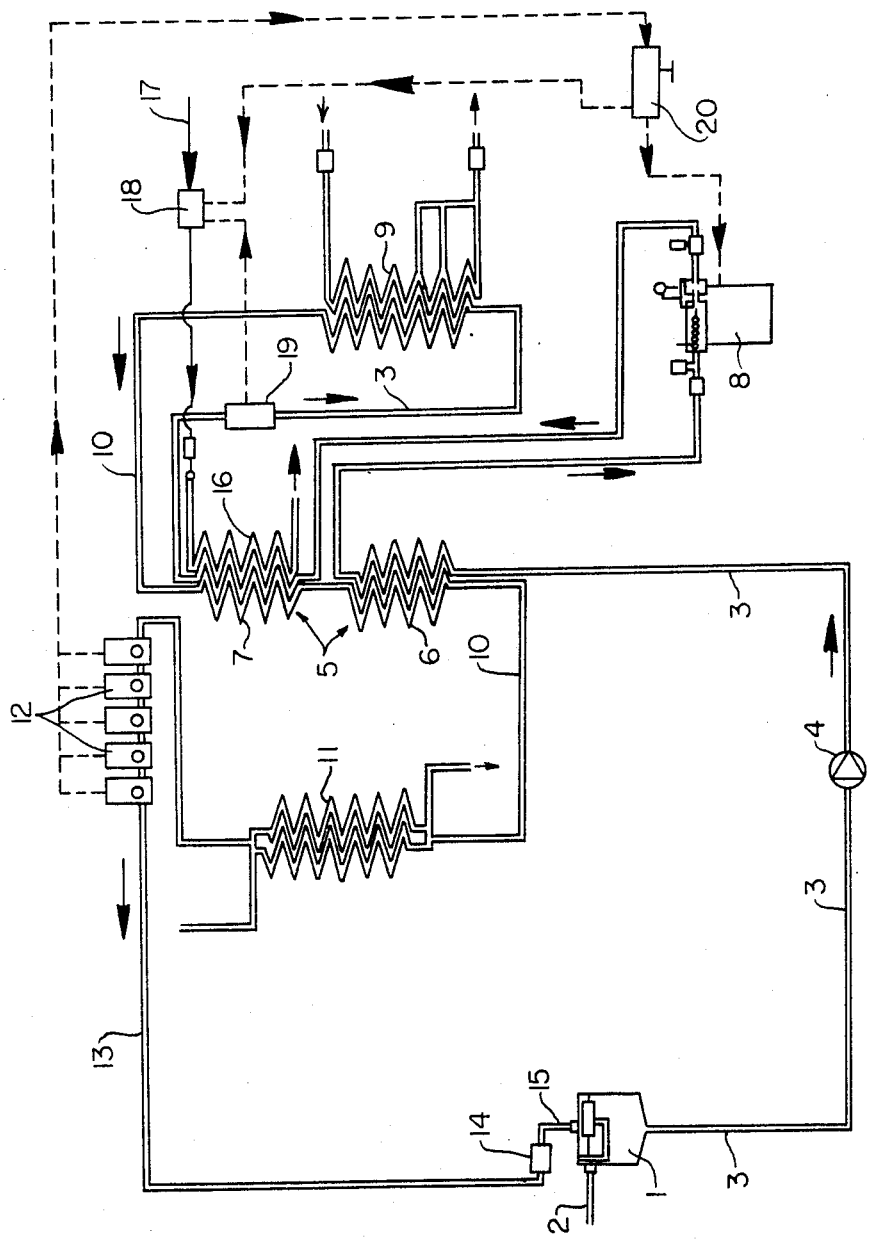

The installation according to FIG. 2 is constructed as follows: A reservoir 1 is provided for the product to be treated, said reservoir being connected to a supply 2 and a transfer conduit 3. The latter conduit contains a pump 4 which conveys the product liquid for treatment to a regenerative heat-exchanger 5 consisting of two parts 6 and 7. Between the two parts 6 and 7 the conduit 3 leads to an homogenizer 8. After leaving part 7 of the regenerative heat-exchanger, conduit 3 leads to a heater or high-temperature (HT) heat-exchanger 9 inside which the product liquid is subjected to the required heat treatment. From this HT heat-exchanger a discharge conduit 10 carries the treated product successively through the parts 7 and 6 of the regenerative heat-exchanger and then through a last heat-exchanger 11, and hereafter reaches a number of bottling stations 12. The output of the installation is so selected that there is provided a small surplus of product liquid with respect to the processing capacity of the stations 12. There will therefore be a minimized return of product through a conduit 13 to the reservoir 1 via a back-pressure valve 14 and an outlet 15.

Figure 1A:
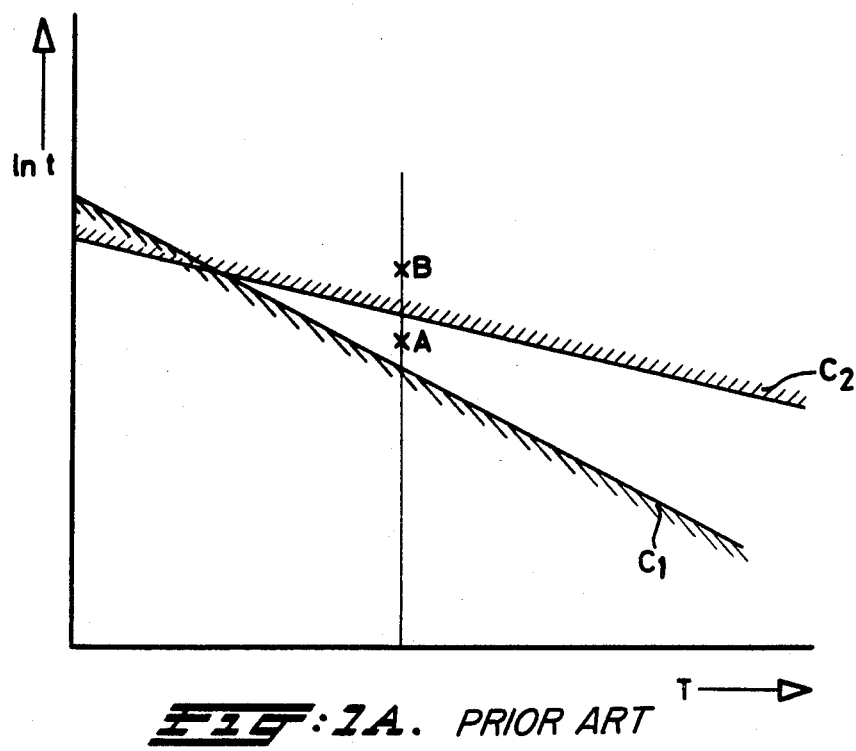
FIGS. 1A and 1B, to which reference has been made heretofor, relate to prior art.
Figure 8:
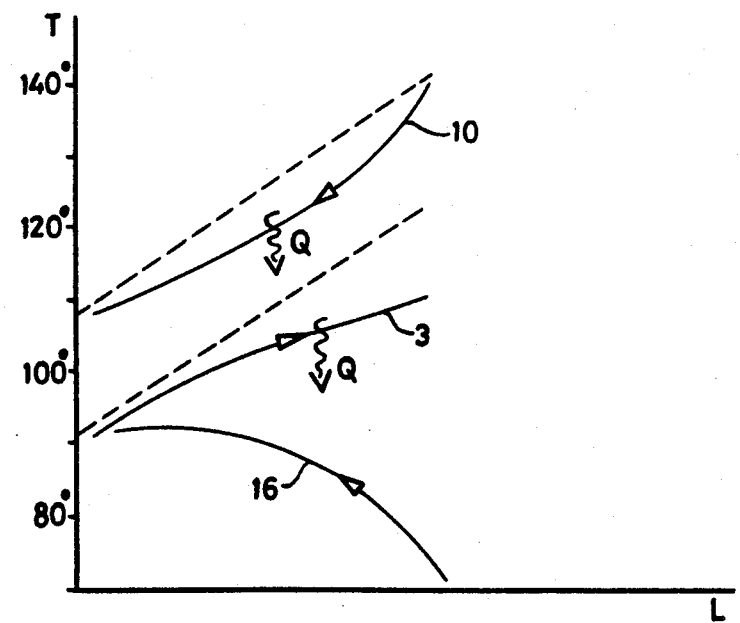
Figure 1B:
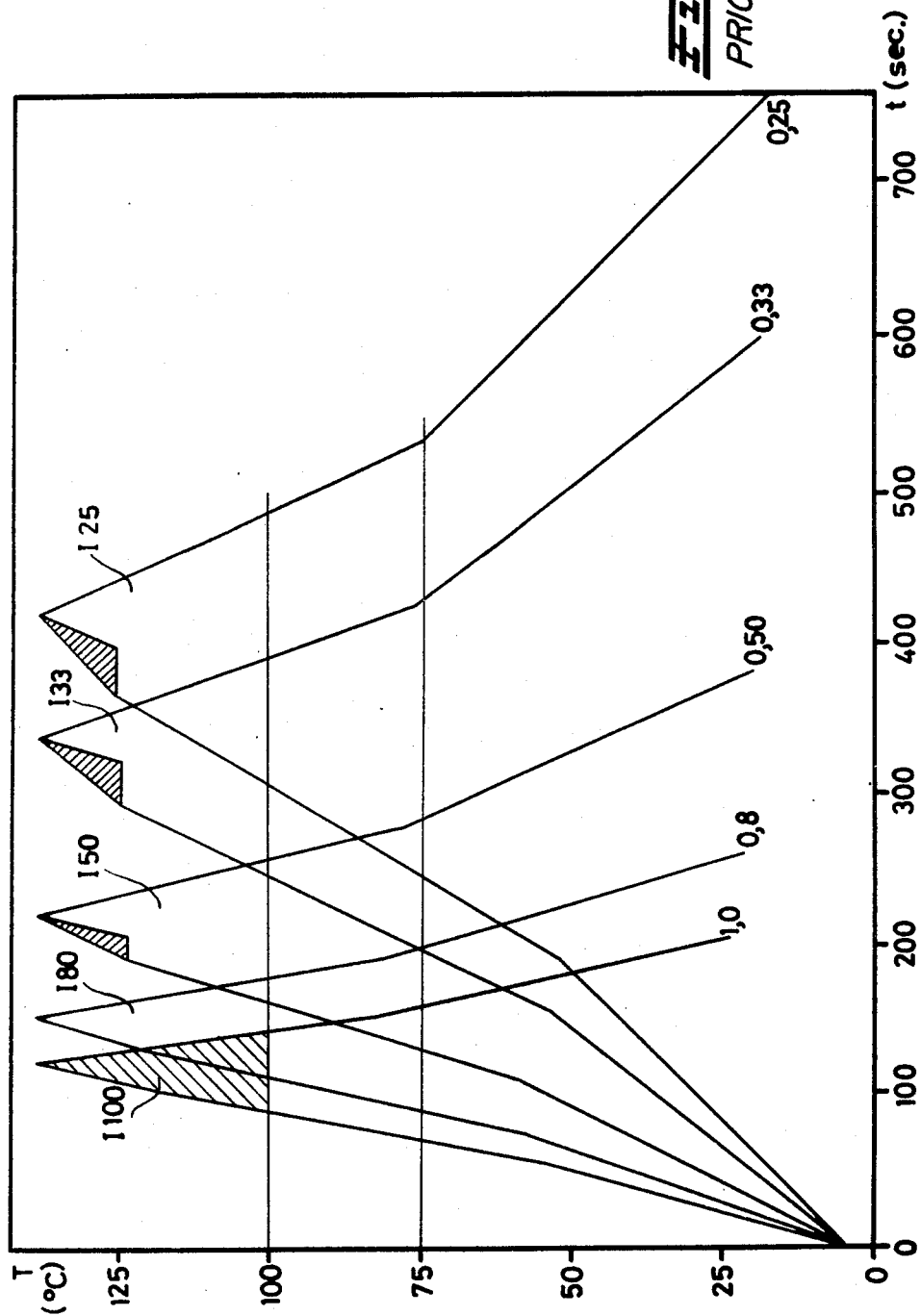

An extra heat-exchanging surface 16 is disposed in element 7 of the regenerative heat-exchanger 5. This surface is contained in a cooling liquid conduit 17 for withdrawing heat from the preheated product liquid to be fed to the HT heat exchanger. Conduit 17 contains a control 18 for influencing the flow of cooling liquid. This control reacts in dependence upon the output and the temperature of the product liquid through the conduit sections 3, for which purpose at least one measuring element 19 is disposed in the section 3 between the heat exchangers 5 and 9. This measuring element can deliver two signals to wit: temperature and output. The temperature and output can, however, also be measured by two elements 19 and 20 as shown in FIG. 2. The temperature signal in this case originates from the measuring element 19 in conduit 3 and the output signal from element 20. The latter is in this case an adjusting means for the speed of revolution of the volumetric pump of the homogenizer 8 in conduit 3, and the signal originating from this adjusting means is therefore proportional to the product liquid flow in the conduit 3. Adjusting means 20 can be adjusted manually or via a command originating from the bottling stations 12. The action of the control means 18 will be explained hereinafter with reference to FIGS. 8-10.

Figure 3:
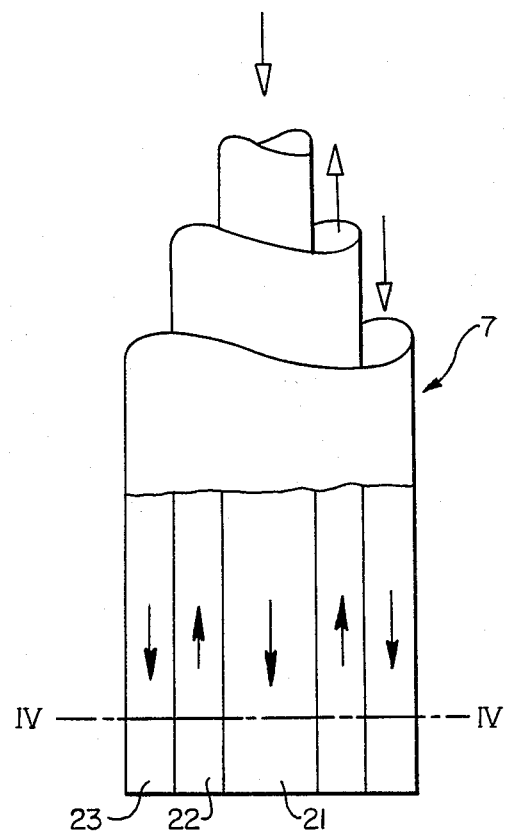
Figure 4:
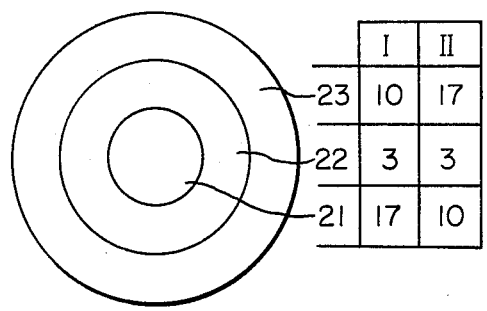

Element 7 of the regenerative heat-exchanger 5 can be constructed as a set of three concentric tubes in which three channels 21, 22 and 23 are formed, see FIGS. 3 and 4. Two adjacent channels 22 and 21 or 23 respectively are always connected in counter-current to the conduit 3 or 17 respectively, the innermost channel 21 or the outermost channel 23 being connected to the cooling liquid conduit 17. The preheated product liquid always flows through the intermediate channel 22 and is fed to the HT heat exchanger 9 to undergo the final heat treatment. The third channel 23 or 21 respectively is connected to the discharge conduit 10 coming from the HT heat-exchanger. These two connection possibilities I and II are shown in a table next to FIG. 4.

Using a plate heat-exchanger for element 7, the conventional plates, according to FIG. 5, are replaced by plates 24 according to FIG. 6, these plates having not only the conventional holes 25 but also an extra set of passage apertures 26 for connection to conduit 17. FIG. 7 finally is a highly diagrammatic illustration of the path of the three different liquids through a plate heat-exchanger constructed in this way.

As already stated hereinbefore, the cooling liquid from conduit 17 is taken in counter-current to the preheated product liquid through a preselected element 7 of the regenerative heat-exchanger, reference FIGS. 3, 5 and 6 above. This counter-current principle is shown graphically by broken lines in FIG. 8, the x-axis showing the length L of the flow channel while the y-axis shows the temperature T. The solid lines show the effect of the cooling liquid fed via conduit 17.

FIG. 9 graphically shows some situations of an imaginary installation under the invention in which the product liquid output $Q_p$ is reduced to half or one-quarter of the maximum output Qpm and the cooling liquid flow Qk is adjusted to a number of values (0-0,10 and 0,90 respectively of the product liquid flow Qp). The dot-dash line shows the temperature/time relationship as it occurs at maximum capacity of the installation according to FIG. 2, and which is to be maintained at other capacities. It will be clearly seen that given the correct choice of the cooling liquid flow Qk, namely about 0,70 for a product liquid flow Qp of 0,50, and 0,90 for a product liquid flow of 0,25, the area I shown in FIG. 9 above the 100° C. can be made substantially equal to the (cross-hatched) temperature/time area associated with the full capacity for which the installation is designed and at which no extra cooling is applied. Thus optimum treatment of the product at different capacities has been rendered possible by a cooling water control via means 18.

The invention is described and explained hereinbefore with reference to a milk sterilizing plant. Obviously the invention is not confined to this example, but can also be applied to similar installations for other products, in which the heat treatment must take place between narrow temperature and time limits.

What is claimed is:

1. In a heat-treatment plant for heat treatment of a product liquid of continuous flow, a high temperature heater and a regenerative heat-exchanger connected thereto, the regenerative heat exchanger having counterflow heat exchange between product liquid entering and leaving the high temperature heater, said regenerative heat exchanger including a cooling liquid passage with a heat exchanging surface for withdrawing heat from the product liquid going to the high temperature heater, a cooling liquid conduit interconnected to the cooling liquid passage, said cooling liquid conduit including a flow control which is reactive to temperature and flow rate of the product liquid, the control having a temperature sensor interconnected to the product liquid conduit leading to the high temperature heater and a flow rate sensor interconnected to the product liquid conduit.

2. A regenerative heat exchanger according to claim 1 wherein the heat exchanger is of concentric tubular construction comprising a set of three concentric tubes which together form three channels, whereby pre-heated product liquid going to the high temperature heater is conducted through one intermediate channel and cooling liquid through one preselected innermost and outermost channel and wherein heated product liquid leaving the high temperature heater is selectively conducted through the opposite of said outermost and innermost channels.

3. A regenerative heat exchanger according to claim 1 wherein the heat exchanger is of plural plate construction, the respective plates defining pre-heated and heated liquid passage apertures and an extra set of cooling liquid passage apertures intermediately disposed with respect to the first said apertures for the passage of cooling liquid.

* * * * *